(12) United States Patent
Mesmakhosroshahi et al.

(10) Patent No.: US 12,412,088 B2
(45) Date of Patent: Sep. 9, 2025

(54) REDUCING OPERATIONS FOR TRAINING NEURAL NETWORKS

(71) Applicant: Microsoft Technology Licensing, LLC, Redmond, WA (US)

(72) Inventors: Maral Mesmakhosroshahi, Sunnyvale, CA (US); Bita Darvish Rouhani, Bellevue, WA (US); Eric S. Chung, Woodinville, WA (US); Douglas C. Burger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1131 days.

(21) Appl. No.: 17/322,194

(22) Filed: May 17, 2021

(65) Prior Publication Data

US 2022/0366236 A1 Nov. 17, 2022

(51) Int. Cl.
*G06N 3/045* (2023.01)
*G06N 3/04* (2023.01)
*G06N 3/08* (2023.01)

(52) U.S. Cl.
CPC ............ *G06N 3/08* (2013.01); *G06N 3/04* (2013.01)

(58) Field of Classification Search
CPC ............ G06N 3/08; G06N 3/04; G06N 3/084
See application file for complete search history.

(56) References Cited

U.S. PATENT DOCUMENTS

| 11,042,700 | B1 * | 6/2021 | Walters | G06F 40/169 |
| 2016/0321540 | A1 * | 11/2016 | Towal | G06V 10/82 |
| 2019/0087673 | A1 * | 3/2019 | Li | G06N 3/084 |
| 2021/0224647 | A1 * | 7/2021 | Wang | G06N 3/045 |

FOREIGN PATENT DOCUMENTS

| CN | 107516129 A | * 12/2017 | ........... G06N 3/0454 |
| CN | 107527337 A | * 12/2017 | ............... G06N 3/08 |
| CN | 108009525 A | * 5/2018 | ........... G06K 9/0063 |
| CN | 108154118 A | * 6/2018 | ......... G06K 9/00724 |

(Continued)

OTHER PUBLICATIONS

Heber, et al., "TATi—Thermodynamic Analytics Toolkit: TensorFlow-based Software for Posterior Sampling in Machine Learning Applications", In Repository of arXiv:1903.08640v1, Mar. 20, 2019, 32 Pages.

(Continued)

*Primary Examiner* — Hassan Mrabi
(74) *Attorney, Agent, or Firm* — Holzer Patel Drennan

(57) ABSTRACT

Embodiments of the present disclosure include systems and methods for reducing operations for training neural networks. A plurality of training data selected from a training data set is used as a plurality of inputs for training a neural network. The neural network includes a plurality of weights. A plurality of loss values are determined based on outputs generated by the neural network and expected output data of the plurality of training data. A subset of the plurality of loss values are determined. An average loss value is determined based on the subset of the plurality of loss values. A set of gradients is calculated based on the average loss value and the plurality of weights in the neural network. The plurality of weights in the neural network are adjusted based on the set of gradients.

20 Claims, 7 Drawing Sheets

(56) References Cited

FOREIGN PATENT DOCUMENTS

| | | | | | |
|---|---|---|---|---|---|
| CN | 109120610 | A | * | 1/2019 | |
| CN | 110309854 | A | * | 10/2019 | |
| CN | 110599532 | A | * | 12/2019 | ........... G06K 9/6256 |
| CN | 110619059 | A | * | 12/2019 | ............ G06F 16/583 |
| CN | 110751157 | A | * | 2/2020 | ............ G06K 9/342 |
| CN | 110852439 | A | * | 2/2020 | .............. G06N 3/08 |
| CN | 111310675 | A | * | 6/2020 | |
| CN | 111444878 | A | * | 7/2020 | ........ G06K 9/00718 |
| CN | 111553209 | A | * | 8/2020 | ........ G06K 9/00718 |
| CN | 111582403 | A | * | 8/2020 | |
| CN | 111931002 | A | * | 11/2020 | ......... G06F 16/9024 |
| CN | 111931496 | A | * | 11/2020 | ............ G06F 40/16 |
| CN | 112022144 | A | * | 12/2020 | |
| CN | 112098714 | A | * | 12/2020 | ........... G01R 22/066 |
| CN | 112288086 | A | * | 1/2021 | ........... G06N 3/0454 |
| CN | 112347247 | A | * | 2/2021 | ............ G06F 16/35 |
| CN | 112561050 | A | * | 3/2021 | .............. G06F 7/483 |
| CN | 112764932 | A | * | 5/2021 | ............. G06F 9/505 |
| CN | 112818986 | A | * | 5/2021 | ........... G06K 9/3241 |
| CN | 111192680 | B | * | 6/2021 | ......... G06F 16/3344 |
| CN | 112990444 | A | * | 6/2021 | |
| CN | 113705597 | A | * | 11/2021 | ........... G06F 18/214 |
| CN | 110110930 | B | * | 3/2022 | ............. G06N 3/006 |
| CN | 114255361 | A | * | 3/2022 | ........... G06V 10/764 |
| CN | 112147465 | B | * | 6/2022 | ......... G01R 31/1218 |
| CN | 114787833 | A | * | 7/2022 | ............ G06F 9/5033 |
| CN | 112825157 | B | * | 10/2022 | ............ G06F 17/15 |
| CN | 112802006 | B | * | 3/2024 | ............ G06N 3/082 |
| WO | WO-2020095729 | A1 | * | 5/2020 | ............ G06N 3/084 |
| WO | WO-2021037174 | A1 | * | 3/2021 | ............ G06N 3/045 |
| WO | WO-2021053381 | A1 | * | 3/2021 | ........... G06N 3/0454 |
| WO | WO-2021210992 | A1 | * | 10/2021 | ............ G06F 16/285 |

OTHER PUBLICATIONS

"International Search Report and Written Opinion Issued in PCT Patent Application No. PCT/US22/026239", Mailed Date: Sep. 5, 2022, 9 Pages.

* cited by examiner

REDUCING OPERATIONS FOR TRAINING NEURAL NETWORKS

BACKGROUND

The present disclosure relates to computing hardware. More particularly, the present disclosure relates to techniques for training neural networks.

A neural network is a machine learning model used for a variety of different applications (e.g., image classification, computer vision, natural language processing, speech recognition, writing recognition, etc.). A neural network may be trained for a particular purpose by running datasets through it, comparing results from the neural network to known results, and updating the network based on the differences.

Many techniques exist to decrease the amount of time it takes to train neural networks. For example, some such techniques utilize multiple devices to parallelize the training of neural networks. Other such techniques look for opportunities to sparsify data in and/or used by neural networks.

BRIEF DESCRIPTION OF THE DRAWINGS

Various embodiments of the present disclosure are illustrated by way of example and not limitation in the figures of the accompanying drawings.

DETAILED DESCRIPTION

Figure 1:
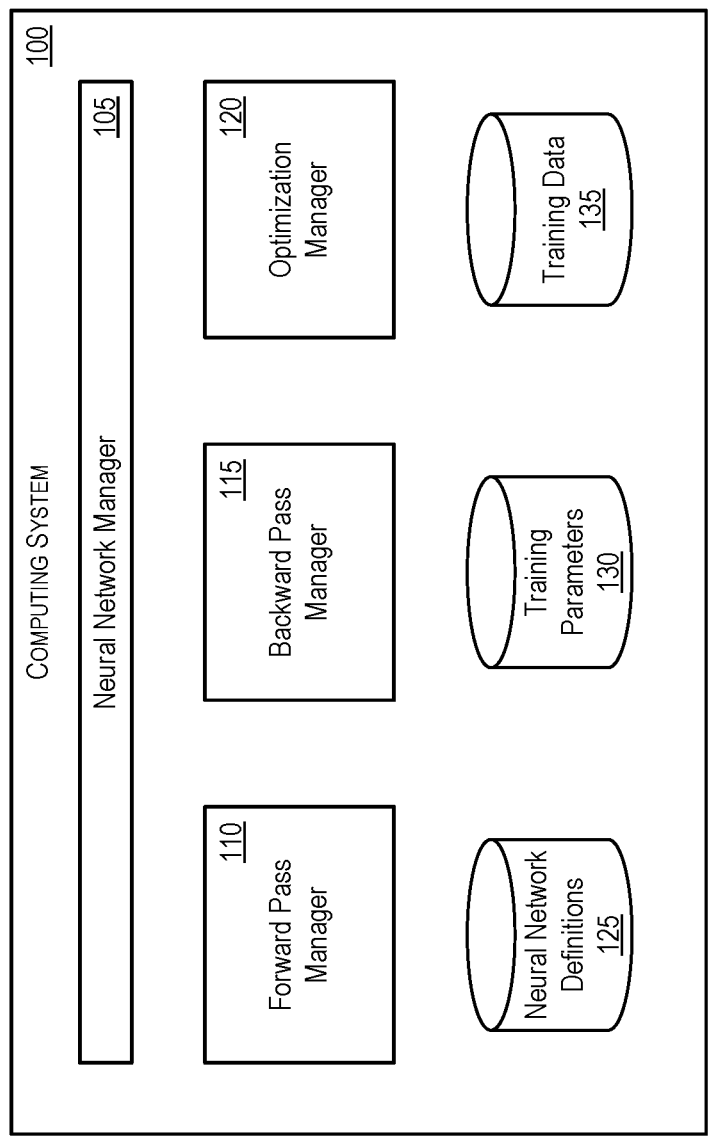
FIG. 1 illustrates a computing system for training neural networks according to some embodiments.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for reducing operations for training neural networks. In some embodiments, a computing system is configured to train neural networks. A neural networks may include several layers and each layer may include a number of weights. When training such a neural network, the computing system can process batches of samples, which are randomly selected from a training data set, through three phases of training the neural network: a forward pass phase, a backward pass phase, and an optimization phase. In the forward pass phase for a particular batch of samples, the computing system processes each of the samples through the neural network. Then, the computing system calculates a loss value for each sample based on the output generated by the neural network for the sample and the expected output of the sample. Next, the computing system determines a defined proportion of the loss values that have the highest values (e.g., the highest 50% of the loss values, the highest 75% of the loss values, etc.) and drops the remaining loss values. The computing system then calculates an average of the loss values based on the defined proportion of the loss values with the highest values. In the backward pass phase for a particular batch of samples, the computing system calculates a set of gradients based on the calculated average of the loss values. For the optimization phase of a particular batch of samples, the computing system uses the set of gradients to update weights in the neural network.

The techniques described in the present application provide a number of benefits and advantages over conventional methods of processing using neural network hardware processors. First, dropping some of the sample loss values from the average loss value calculation during training of a neural network allows the neural network to be trained faster and, thus, reach convergence faster. Second, during training of a neural network, calculating gradients based on an average loss value calculated from some sample loss values and then adjusting weights in the neural network based on the gradients reduces the number of operations to train the neural network for a given number of samples. Conventional methods of training the neural network using the same number of given samples utilize many more operations to achieve the same training of the neural network.

FIG. 1 illustrates a computing system 100 for training neural networks according to some embodiments. As shown, computing system 100 includes neural network manager 105, forward pass manager 110, backward pass manager 115, optimization manager 120, and storages 125-135. Neural network definitions storage 125 is configured to store definitions of neural networks. In some embodiments, a definition of a neural network specifies the number of layers in the neural network, the number of nodes in each layer, the weights in the neural network, the activations functions used in the nodes, the loss function used to compute losses, etc.

Training parameters storage 130 stores training parameters for neural networks. Examples of training parameters include a number of samples in a training data set, a batch size, a number of training stages, a proportion of the training data set to process in each training stage, a proportion of loss values having the highest values to use in each training stage, a batch size ratio for each training stage, etc. A batch size can represent the number of samples to process in a forward pass phase. A number of training stages may represent the number of stages to use to process an entire training data set. A batch size ratio can represent a proportion of the batch size to use for the forward pass training phase during a training stage.

Training data storage 135 is configured to store training data sets for training neural networks. In some embodiments, a training data set includes a set of samples (also referred to as training samples). Each sample includes a set of inputs (also referred to as input data) and a set of expected outputs (also referred to as expected output data). For instance, a set of inputs of a sample can be a matrix or vector of a set of numerical values (e.g., integers, floating point numbers, etc.). Similarly, a set of expected outputs of a sample can be a matrix or vector of a set of numerical values (e.g., integers, floating point numbers, etc.). In some embodiments, storages 125-135 are implemented in a single physical storage while, in other embodiments, storages 125-135 may be implemented across several physical storages. While FIG. 1 shows storages 125-135 as part of computing system 100, one of ordinary skill in the art will appreciate that neural network definitions storage 125, training parameters storage 130, and/or training data storage 135 may be external to computing system 100 in some embodiments.

Neural network manager 105 is responsible for creating neural networks. For instance, neural network manager 105 may receive from computing system 100 or a user of client device (not shown in FIG. 1) a request to train a neural network with a training data set. In response, neural network manager 105 accesses neural network definitions storage 125 to retrieve the neural network definition associated with the requested neural network. Neural network manager 105 generates a neural network based on the neural network definition. Next, neural network manager 105 accesses training parameters storage 130 to retrieve the training parameters associated with the neural network. Then, neural network manager 105 accesses training data storage 135 to retrieve the specified training data set for training the neural network.

Based on the training parameters, neural network manager 105 instructs forward pass manager 110, backward pass manager 115, and optimization manager 120 to control the training of the neural network. As an example, to perform a forward pass phase on a neural network, neural network manager 105 generates a batch of samples by randomly selecting a defined number of samples from the training data set. Then, neural network manager 105 sends forward pass manager 110 the batch of samples and a request to perform a forward pass on the neural network. In return, neural network manager 105 can receive from forward pass manager 110 a set of outputs generated by the neural network. Next, neural network manager 105 may calculate loss values based on the set of outputs and the set of expected outputs in the batch of samples. Neural network manager 105 then calculates an average of the loss values and sends backward pass manager 115 the average of the loss values and a request to perform a backward pass on the neural network. Once neural network manager 105 receives a set of gradients from backward pass manager 115, neural network manager 105 sends them to optimization manager 120 along with a request to adjust weights in the neural network.

Forward pass manager 110 is responsible for managing forward pass phases of training neural networks. For example, forward pass manager 110 can receive from neural network manager 105 a request to process a batch of samples on a neural network. In response, forward pass manager 110 iteratively processes each sample in the batch of sample through the neural network and keeps track of each output generated by the neural network. Once forward pass manager 110 finishes processing the batch of samples, forward pass manager 110 sends the outputs to neural network manager 105.

Backward pass manager 115 is configured to manage backward pass phases of training neural networks. For instance, backward pas manager 115 may receive from neural network manager 105 an average of loss values and a request to perform a backward pass on a neural network. In response to the request, backward pass manager 115 generates a set of gradients based on the average of loss values. In some embodiments, backward pass manager 115 uses a backpropagation technique to generate the set of gradients.

Optimization manager 120 manages the optimization phases of training neural networks. For example, optimization manager 120 can receive from neural network manager 105 a set of gradients and a request to update weights in a neural network. In response, optimization manager 120 adjusts weights in the neural network based on the set of gradients. In some embodiments, optimization manager 120 uses a gradient method (e.g., a gradient descent method, a stochastic gradient descent method, etc.) to adjust weights in a neural network.

Figure 2:
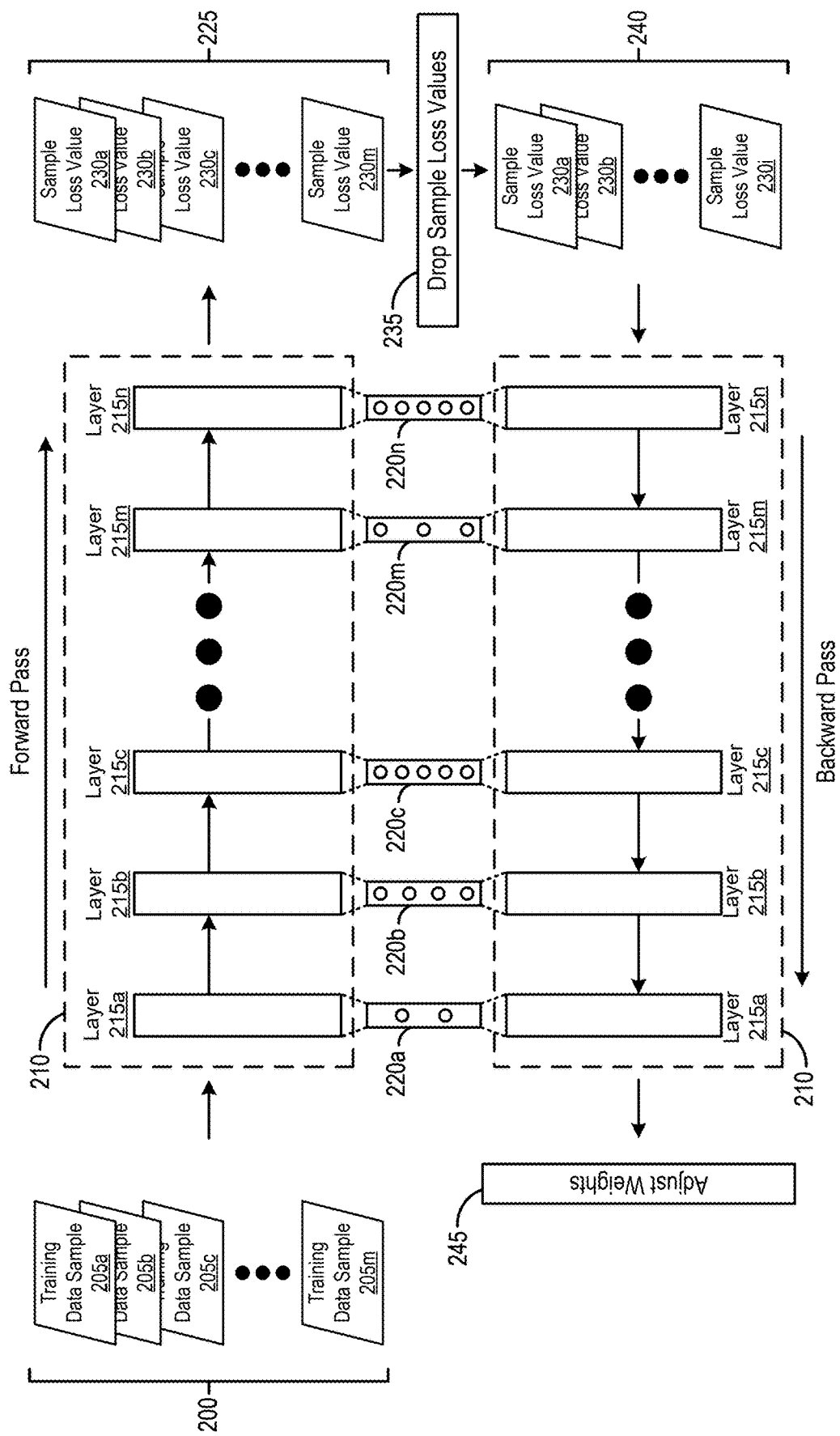
FIG. 2 illustrates an example of reducing operations for training a neural network according to some embodiments.

FIG. 2 illustrates an example of reducing operations for training a neural network 210 according to some embodiments. For the example operation, computing system 100 is used to train neural network 210. Prior to the example operation, neural network manager 105 receives a request from computing system 100 to train neural network 210 with a training data set. Upon receiving the request, neural network manager 105 accesses neural network definitions storage 125 and retrieves the neural network definition associated with the requested neural network. Next, neural network manager 105 generates neural network 210 based on the neural network definition. As depicted in FIG. 2, neural network 210 includes layers 215a-n. Each of the layers 215a-n include a set of corresponding weights 220. Neural network manager 105 can initialize the values of weights 220a-n with randomly generated values (e.g., integers, floating point numbers, etc.). Next, neural network manager 105 accesses training parameters storage 130 to retrieve the training parameters associated with neural network 210. Neural network manager 105 then accesses training data storage 135 to retrieve the specified training data set for training neural network 210.

The example operation demonstrates how operations are reduced through the processing of one batch of samples by neural network 210. The operation starts by neural network manager 105 randomly selecting samples from the training data set to generate batch of samples 200. As shown, batches of samples 200 includes training data samples 205a-m. After generating batch of samples 200, neural network manager 105 sends forward pass manager 110 batch of samples 200 and a request to perform a forward pass on neural network 210. In response to the request, forward pass manager 110 processes each sample 205 in batch of samples 200 through neural network 210. Neural network 210 generates an output for each sample 205 that is processed through it. Once forward pass manager 110 finishes processing batch of samples 200, forward pass manager 110 sends the outputs generated by neural network 210 to neural network manager 105

After receiving the outputs, neural network manager 105 calculates batch of loss values, which includes loss values 230a-m, based on the outputs generated by neural network 210 and the expected outputs of training data samples 205a-m in batch of samples 200. In this example, neural network 210 is configured to use a mean squared error loss function to compute loss values. Neural network manager 105 then determines a defined portion of batch of loss values 225 having the highest values. In some embodiments, the defined portion is specified in the training parameters associated with neural network 210. For example, if the training parameters associated with neural network 210 specifies 75% as the defined proportion of loss values with the highest values, neural network manager 105 determines the 75% of the loss values with the highest values and drops the lowest 25% of loss values. As shown in FIG. 2, neural network manager 105 drops, at operation 235, loss values from batch of loss values 225 to form batch of loss values 240, which includes sample loss values 230a-i.

In some embodiments, the defined proportion is determined based on statistics collected from previously processed batches of samples and statistics collected from the processing of batch of samples 200. For instance, in some such embodiments, neural network manager 105 may process a defined proportion of the training data set during a particular stage of training neural network 210, which can be specified in the training parameters associated with neural network 210, and collects some statistical information during the particular training stage. Neural network manager 105 generates batches of samples randomly selected from the training data set, which collectively amount to the defined proportion specified in the training parameters. As an example, the training parameters associated with neural network 210 may specify to collect statistical information from processing 25% of the training data set during a first stage of training neural network 210. If the training parameters associated with neural network 210 species that the training data set includes 500 samples and a batch size of 25 samples, neural network manager 105 would randomly select 125 samples and generate five batches of 25 samples to train neural network 210. Then, neural network manager 105 would instruct forward pass manager 110, backward pass manager 115, and optimization manager 120 to process the five batches in a similar manner as that described above by reference to FIG. 1. During the processing of each of the five batches of samples, neural network manager 105 calculates the variance of the loss values of the batch of samples. After this first stage of training is completed (i.e., after neural network 210 is trained using the five batches of samples), neural network manager 105 calculates an average of the variances and determines the variance having the highest value. Based on the average variance and the highest variance, neural network manager 105 determines a proportion of loss values 230a-m to use to calculate an average.

Figure 3:
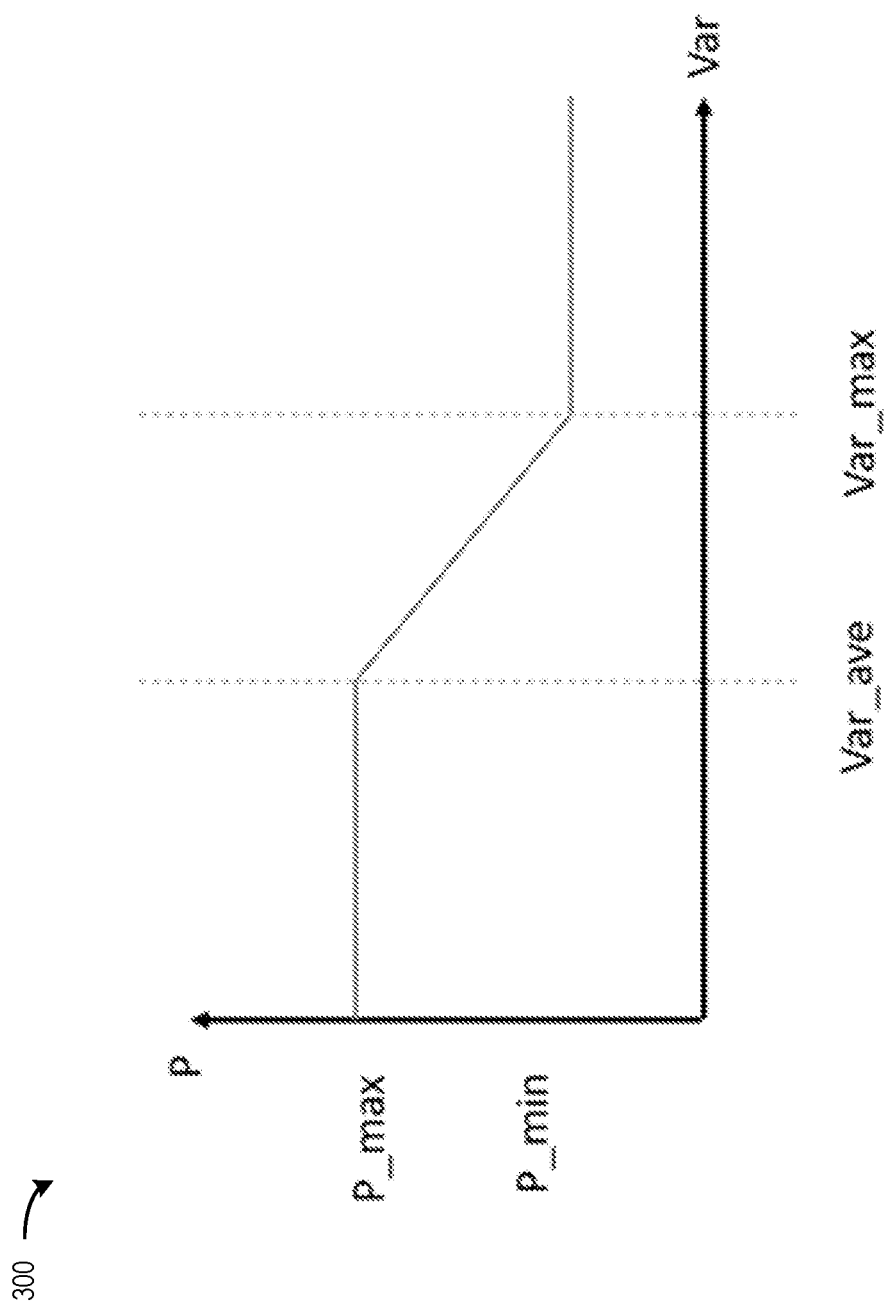
FIG. 3 illustrates a graph showing example proportions to use for average loss calculations based on variance values according to some embodiments.

FIG. 3 illustrates a graph 300 showing example proportions to use for average loss calculations based on variance values according to some embodiments. As shown, graph 300 includes an x-axis representing variance values and a y-axis representing proportion values. Var_ave represents the average variance that neural network manage 105 calculates based on the variances determined for the processing of samples in a particular stage of training (e.g., the processing of the five batches of samples during the first stage of training neural network 210 described above). Var_max is the variance that neural network manager 105 determines with the highest value. P_max is the highest proportion value and P_min is the lowest proportion value. P_max and P_min may be specified in the training parameters for training a neural network. Based on graph 300, neural network manager 105 determines the value of P_max as the proportion of loss values 230a-m if the variance of loss values 230a-m is less than or equal to the Var_ave value. If the variance of loss values 230a-m is greater than the Var_ave value and less than the Var_max value, neural network manager 105 determines the proportion of loss values 230a-m as a linearly scaled value between P_min and P_max based on the value of the variance of loss values 230a-m. If the variance of loss values 230a-m is greater than or equal to the Var_max value, neural network manager 105 determines the value of P_min as the proportion of loss values 230a-m. Neural network manager 105 uses the determine proportion value to determine batch of loss values 240.

The example above explains one method for measuring the spread of loss values (e.g., how dispersed the loss values are). One of ordinary skill in the art will appreciate that other methods may be used to measure the spread of loss values in some embodiments. For example, The spread of loss values can be measured using the range of loss values (e.g., min and max loss values), quartiles, interquartile ranges, absolute deviations, standard deviations, etc.

Returning to FIG. 2, neural network manager 105 calculates an average of loss values 230a-I based on batch of loss values 240. Then, neural network manager 105 sends backward pass manager 115 the average of loss values 230a-i and a request to perform a backward pass on neural network 210. In response to receiving the request and the average of the loss values from neural network manager 105, backward pass manager 115 generates a set of gradients based on the average of loss values. For this example, backward pass manager 115 uses a backpropagation technique to generate the set of gradients. In particular, backward pass manager 115 generates the set of gradients by computing the gradients of the loss function with respect to weights 220a-n in neural network 210. Next, backward pass manager 115 sends the set of gradients to neural network manager 105. Upon receiving the set of gradients, neural network manager 105 sends optimization manager 120 the set of gradients and a request to adjust weights 220a-n in neural network 210. In response to the request, optimization manager 120 uses the set of gradients to adjust, at operation 245, weights 220a-n in neural network 210. In this example, optimization manager 120 employs a stochastic gradient descent technique to adjust weights 220a-n based on the set of gradients. As illustrated via the techniques used in this example operation, neural network 210 is trained based on batch of samples 200 using batch of loss values 240, which is a portion of batch of loss values 225.

The following examples show how the number of operations can be reduced when training a neural network using the techniques depicted in the example operation described by reference to FIG. 2. For these examples, N represents the number of samples in the training data set and B represents the batch size. It is assumed that a forward pass operation on a batch of B samples takes F number of operations. When a batch size greater than B is used for forward pass operations, it takes 2F number of operations to complete. In addition, it is assumed that a backward pass operation and an optimization operation using a batch of B samples takes 2F number of operations.

TABLE 1

| Stage | Forward Batch size | Backward Batch size | Total flops/F | % Data | Total flop |
|---|---|---|---|---|---|
| 1 | B | B | (N/B) × (F + 2F) | 12.5 | 0.125 × (N/B) × (F + 2F) |
| 2 | 1.25B | B | (N/1.25B) × (2F + 2F) | 12.5 | 0.125 × (N/1.25B) × (2F + 2F) |
| 3 | 1.5B | B | (N/1.5B) × (2F + 2F) | 25 | 0.25 × (N/1.5B) × (2F + 2F) |
| 4 | 2B | B | (N/2B) × (2F + 2F) | 50 | 0.5 × (N/2B) × (2F + 2F) |
| Total | | | | | 2.435NF/B |
| Total baseline | | | | | 3NF/B |
| % saving | | | | | 18.8% |

The example shown in Table 1 divides the training of a neural network into four stages. The first stage uses 12.5% of the training data set, the second stage uses another 12.5% of the training data set, the third stage uses 25% of the training data set, and the fourth stage uses the last 50% of the training data set. For the four different stage, different batch sizes are used and different proportions of loss values are dropped. In the first stage, B number of samples are processed through the neural network in each forward pass. Neural network manager 105 does not drop any loss values in the first stage so B number of samples are used in the backward pass. That is, the loss values from B number of samples are used to train the neural network (e.g., generate gradients and adjust weights of the neural network) during the backward passes in the first stage.

For the second stage, 1.25B number of samples are processed through the neural network in each forward pass. In other words, the batch size used in the forward passes is 25% greater than that used in the first stage. Neural network manager 105 is configured to calculate an average loss value using the 80% of the highest loss values (i.e., dropping 20% of the lowest loss values) for the backward passes in the second stage of training the neural network. This results in B number of samples used in these backwards passes.

The third stage uses batches containing 1.5B samples to train the neural network during the forward passes. For each backward pass in the third stage, neural network manager 105 uses 66.66% of the highest loss values, which is B number of loss values, to calculate an average loss value (i.e., dropping 33.33% of the lowest loss values). In the last stage, a batch size of 2B is used to train the neural network in the forward passes. Neural network manager 105 calculates an average loss value for each backward pass using 50% of the highest loss values (i.e., dropping 50% of the lowest loss values). This results in B number of samples being used for backwards passes in the last stage.

The total baseline number of operations represents the number of operations to train the neural network without dropping any loss values for the average loss value calculation. Thus, a batch size of B is used for both the forward passes and the backward passes. As depicted in Table 1, using the techniques demonstrated in the example operation described above by reference to FIG. 2 and the training parameters in Table 1 results in an 18.8% reduction in the number of operations to train the neural network relative to the total baseline number of operations.

TABLE 2

| Stage | Forward Batch size | Backward Batch size | Total flops/F | % Data | Total flops |
|---|---|---|---|---|---|
| 1 | B | B | (N/B) × (F + 2F) | 12.5 | 0.125 × (N/B) × (F + 2F) |
| 2 | 2B | B | (N/2B) × (2F + 2F) | 87.5 | 0.875 × (N/2B) × (2F + 2F) |
| Total | | | | | 1.75NF/B |
| Total baseline | | | | | 3NF/B |
| % saving | | | | | 41% |

The training parameters in Table 1 show a four stage training configuration. Additional reductions in the number of operations are possible when using less training stages. The example shown in Table 2 divides the training of a neural network into two stages. The first stage uses 12.5% of the training data set and the second stage uses the remaining 87.5% of the training data set. The first stage uses B number of samples to train the neural network in each forward pass. For the first stage, neural network manager 105 does not drop any loss values. As such, B number of samples are used for the backward passes in the first stage.

In the second stage, a batch size of 2B is used to train the neural network in the forward passes. Neural network manager 105 is configured to use 50% of the highest loss values (i.e., dropping 50% of the lowest loss values) to calculate an average loss value for each backward pass. Hence, B number of samples are used for backwards passes in the second stage.

The total baseline number of operations represents the number of operations to train the neural network without dropping any loss values for the average loss value calculation. As such, a batch size of B is used for both the forward passes and the backward passes. As illustrated in Table 2, using the techniques demonstrated in the example operation described above by reference to FIG. 2 and the training parameters in Table 2 results in a 41% reduction in the number of operations to train the neural network relative to the total baseline number of operations.

In some embodiments, the hardware used to process neural networks is capable of processing batch sizes greater than B through the forward pass in F number of operations (as opposed to 2F in the configurations shown in Tables 1 and 2).

TABLE 3

| Stage | Forward Batch size | Backward Batch size | Total flops/F | % Data | Total flops |
|---|---|---|---|---|---|
| 1 | B | B | (N/B) × (F + 2F) | 12.5 | 0.125 × (N/B)×(F + 2F) |
| 2 | 1.25B | B | (N/1.25B) × (F + 2F) | 12.5 | 0.125 × (N/1.25B) × (F + 2F) |
| 3 | 1.5B | B | (N/1.5B) × (F + 2F) | 25 | 0.25 × (N/1.5B) × (F + 2F) |
| 4 | 2B | B | (N/2B) × (F + 2F) | 50 | 0.5 × (N/2B) × (F + 2F) |
| Total | | | | | 1.925NF/B |
| Total baseline | | | | | 3NF/B |
| % saving | | | | | 36% |

Table 3 includes the same training parameters as Table 1. The only difference is it takes only F number of operations to perform forward passes in the second, third, and fourth stages. As shown, the reduction in the number of operations when using such hardware is 36%.

TABLE 4

| Stage | Forward Batch size | Backward Batch size | Total iterations/F | % Data | Total time |
|---|---|---|---|---|---|
| 1 | B | B | (N/B) × (F + 2F) | 12.5 | 0.125 × (N/B) × (F + 2F) |
| 2 | 2B | B | (N/2B) × (F + 2F) | 87.5 | 0.875 × (N/2B) × (F + 2F) |
| Total | | | | | 1.31NF/B |
| Total baseline | | | | | 3NF/B |
| % saving | | | | | 56% |

Table 4 includes the same training parameters as Table 2. Here, it takes F number of operations to perform forward passes in the second stage. Using this type of hardware results in a 56% reduction in the number of operations to train the neural network.

Figure 4:
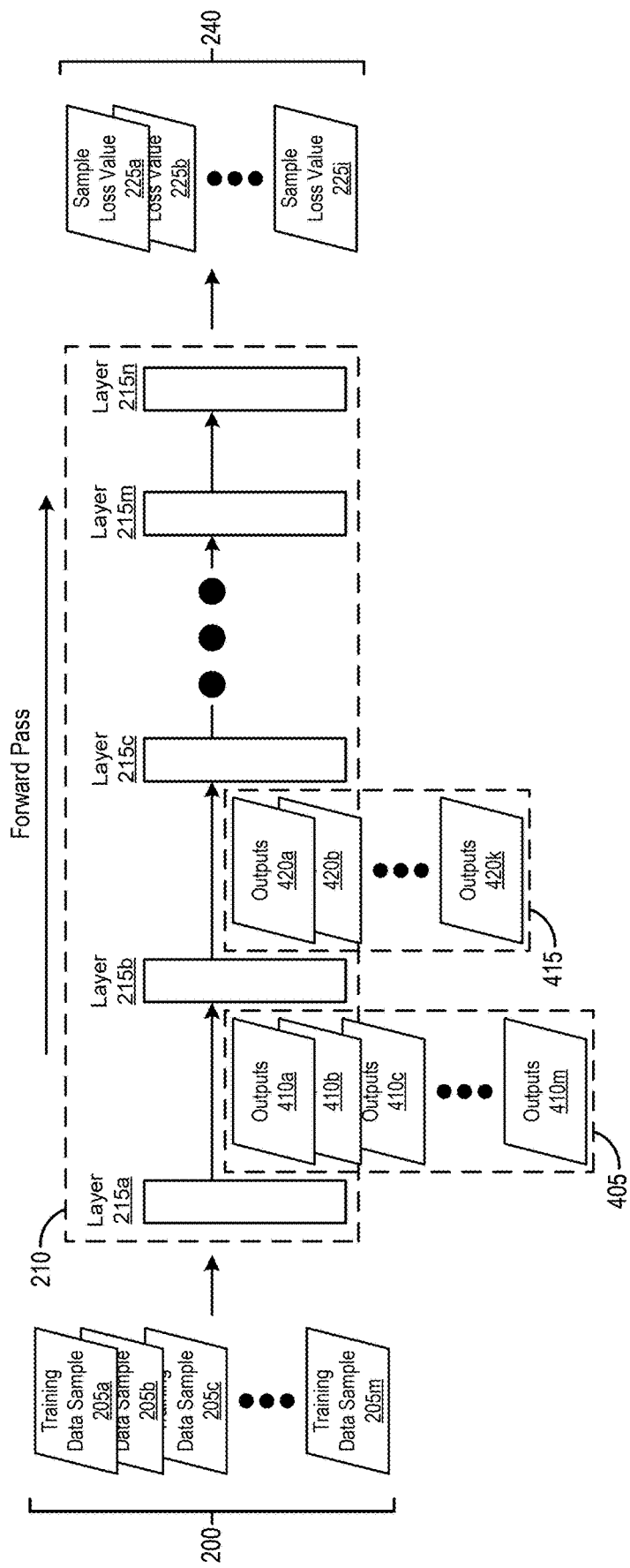
FIG. 4 illustrates an example of reducing operations during a forward pass according to some embodiments.

The examples and embodiments described above by reference to FIGS. 2 and 3 as well as Tables 1-4 show how operations can be reduced during the backward passes of training a neural network. In some embodiments, similar techniques can be employed to reduce the number of operations to train neural networks during the forward passes. FIG. 4 illustrates an example of reducing operations during a forward pass according to some embodiments. Specifically, FIG. 4 illustrates batch of samples 200 processed through neural network 210 in a forward pass similar to the example operations shown in FIG. 2. However, in this example, forward pass manager 110 is configured to process batch of samples 200 differently. In particular, forward pass manager 110 processes each sample in batch of samples 200 through a particular layer, calculates loss values for the outputs of the particular layer, and determines a defined proportion of the outputs to drop based on the loss values.

For this example, neural network 210 generates batch of outputs 405, which includes outputs 410a-m, after the first layer 215a. Here, forward pass manager 110 does not drop any outputs 410a-m in batch of outputs 405. Therefore, outputs 410a-m are used as inputs for layer 215b. After layer 215b uses outputs 410a-m as inputs to generate outputs, forward pass manager 110 calculates losses for those outputs and determines a defined proportion of the outputs associated with the highest loss values (i.e., drop outputs associated with the lowest loss values), forward pass manager 110 feeds the defined proportion of the outputs to layer 215c for processing. In this example, the outputs that forward pass manager 110 passes to layer 215c is batch of outputs 415, which includes outputs 420a-k. Forward pass manager 110 repeats these operations for subsequent layers 215 in neural network 210. After layer 215n, neural network generates i number of outputs for this example. Sample loss values 225a-i are the loss values associated with those outputs. The backward pass and optimization of weights 220a-n of neural network operate in the same fashion as the example operation described above by reference to FIG. 2.

FIG. 4 shows a different technique for achieving the same result as the example illustrated in FIG. 2. This technique reduces the number of operations performed in the forward pass compared to the number of operations performed in the forward pass illustrated in FIG. 2. This allows even more operations to be reduced during the training of neural network 210 than the techniques described above by reference to the example shown in FIG. 2.

Figure 5:
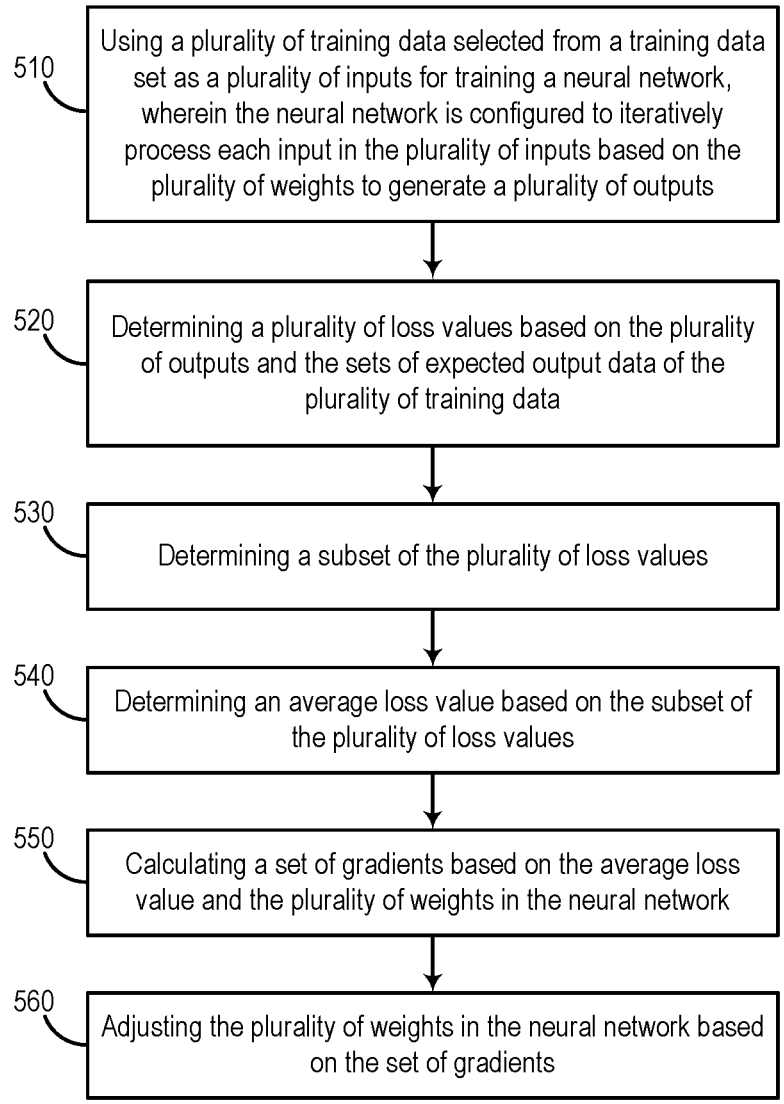
FIG. 5 illustrates a process for reducing operations for training a neural network according to some embodiments.

FIG. 5 illustrates a process 500 for reducing operations for training a neural network according to some embodiments. In some embodiments, computing system 100 performs process 500. Process 500 begins by using, at 510, a plurality of training data selected from a training data set as a plurality of inputs for training a neural network. The neural network comprises a plurality of weights. The neural network is configured to iteratively process each input in the plurality of inputs based on the plurality of weights to generate a plurality of outputs. Each training data in the training data set comprises a set of input data and a set of expected output data. Referring to FIG. 2 as an example, neural network manager 105 uses batch of samples 200 as inputs for training neural network 210.

Next, process 500 determines, at 520, a plurality of loss values based on the plurality of outputs and the sets of expected output data of the plurality of training data. Referring to FIG. 2 as an example, after neural network manager 105 receives the outputs generated by neural network 210 for samples 205a-m, neural network manager 105 determines loss values 230a-m based on the outputs and expected outputs of training data samples 205a-m.

Process 500 then determines, at 530, a subset of the plurality of loss values. Referring to FIG. 2 as an example, neural network manager 105 determines a defined proportion of batch of loss values 225 having the highest values (i.e., drops a defined proportion of batch of loss values having the lowest values). At 540, process 500 determines an average loss value based on the subset of the plurality of loss values. Referring to FIG. 2 as an example, neural network manager 105 determines an average of loss values 230a-i.

Then, process 500 calculates, at 550, a set of gradients based on the average loss value and the plurality of weights in the neural network. Referring to FIG. 2 as an example, backward pass manager 115 calculates a set of gradients based on the average loss value using a backpropagation technique. Finally, process 500 adjusts, at 560, the plurality of weights in the neural network based on the set of gradients. Referring to FIG. 2 as an example, optimization manager 120 adjusts weights 220*a-n* of neural network 210 based on the set of gradients using a stochastic gradient descent method.

Figure 6:
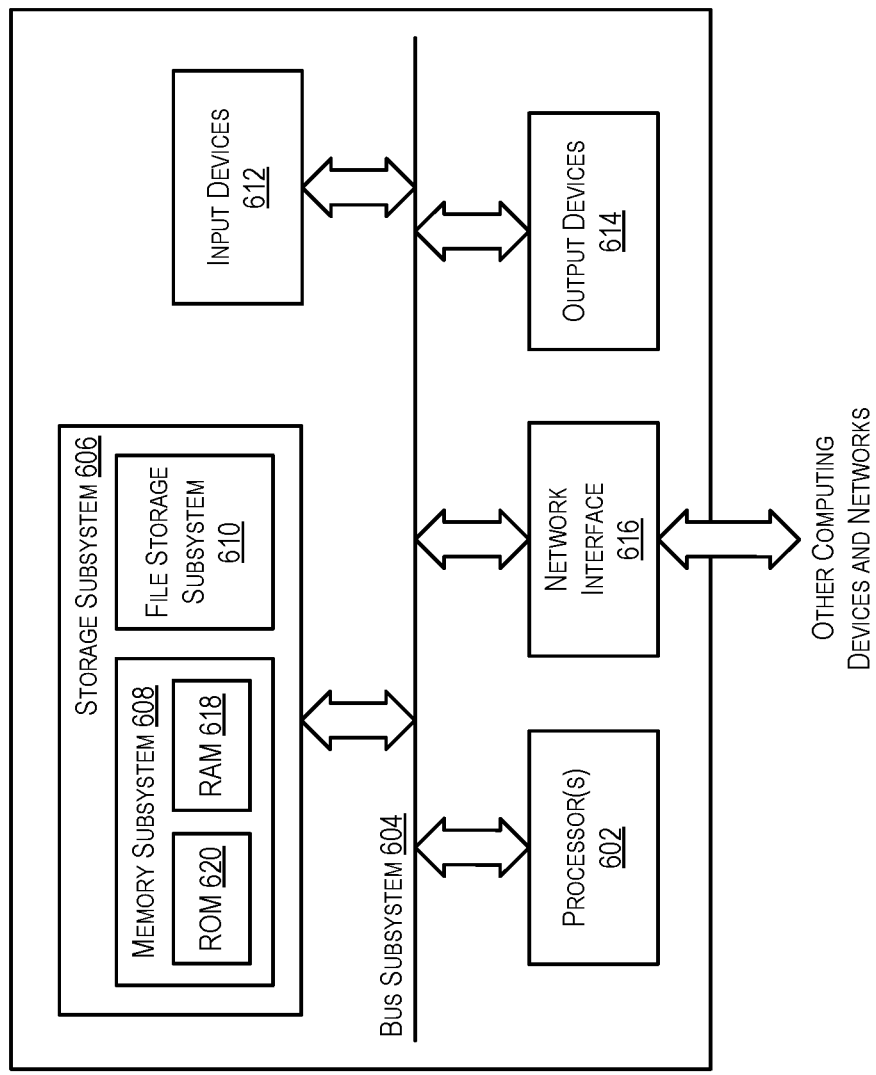
FIG. 6 depicts a simplified block diagram of an example computer system according to some embodiments.

The techniques describe above may be implemented in a wide range of computer systems configured to process neural networks. FIG. 6 depicts a simplified block diagram of an example computer system 600, which can be used to implement the techniques described in the foregoing disclosure. As shown in FIG. 6, computer system 600 includes one or more processors 602 that communicate with a number of peripheral devices via a bus subsystem 604. These peripheral devices may include a storage subsystem 606 (e.g., comprising a memory subsystem 608 and a file storage subsystem 610) and a network interface subsystem 616. Some computer systems may further include user interface input devices 612 and/or user interface output devices 614.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple busses.

Network interface subsystem 616 can serve as an interface for communicating data between computer system 600 and other computer systems or networks. Embodiments of network interface subsystem 616 can include, e.g., Ethernet, a Wi-Fi and/or cellular adapter, a modem (telephone, satellite, cable, ISDN, etc.), digital subscriber line (DSL) units, and/or the like.

Storage subsystem 606 includes a memory subsystem 608 and a file/disk storage subsystem 610. Subsystems 608 and 610 as well as other memories described herein are examples of non-transitory computer-readable storage media that can store executable program code and/or data that provide the functionality of embodiments of the present disclosure.

Memory subsystem 608 includes a number of memories including a main random access memory (RAM) 618 for storage of instructions and data during program execution and a read-only memory (ROM) 620 in which fixed instructions are stored. File storage subsystem 610 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and many other configurations having more or fewer components than system 600 are possible.

Figure 7:
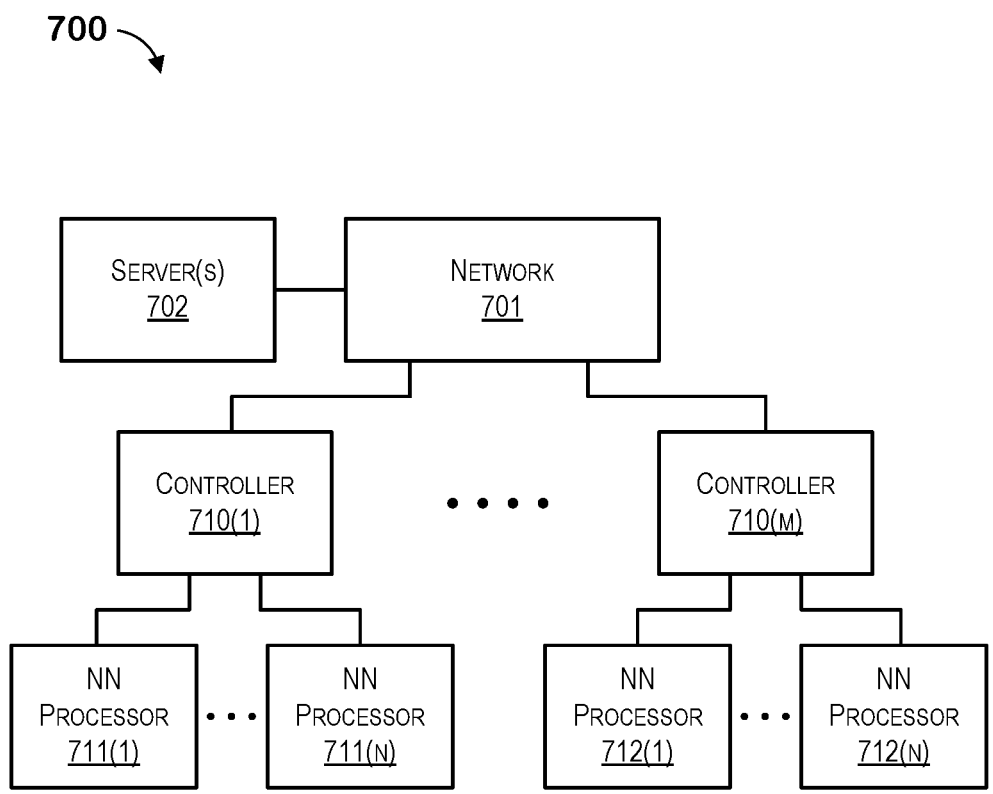
FIG. 7 illustrates a neural network processing system according to some embodiments.

FIG. 7 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 702, which may comprise architectures illustrated in FIG. 6 above, may be coupled to a plurality of controllers 710(1)-710(M) over a communication network 701 (e.g. switches, routers, etc.). Controllers 710(1)-710(M) may also comprise architectures illustrated in FIG. 6 above. Each controller 710(1)-710(M) may be coupled to one or more NN processors, such as processors 711(1)-711(N) and 712(1)-712(N), for example. NN processors 711(1)-711(N) and 712(1)-712(N) may include a variety of configurations of functional processing blocks and memory optimized for neural network processing, such as training or inference. The NN processors are optimized for neural network computations. Server 702 may configure controllers 710 with NN models as well as input data to the models, which may be loaded and executed by NN processors 711(1)-711(N) and 712(1)-712(N) in parallel, for example. Models may include layers and associated weights as described above, for example. NN processors may load the models and apply the inputs to produce output results. NN processors may also implement training algorithms described herein, for example.

Further Example Embodiments

In various embodiments, the present disclosure includes systems, methods, and apparatuses for reducing operations for training neural networks. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a non-transitory machine-readable medium storing a program executable by at least one processing unit of a device. The program comprising sets of instructions for using a plurality of training data selected from a training data set as a plurality of inputs for training a neural network, wherein the neural network comprises a plurality of weights, wherein the neural network is configured to iteratively process each input in the plurality of inputs based on the plurality of weights to generate a plurality of outputs, wherein each training data in the training data set comprises a set of input data and a set of expected output data; determining a plurality of loss values based on the plurality of outputs and the sets of expected output data of the plurality of training data; determining a subset of the plurality of loss values; determining an average loss value based on the subset of the plurality of loss values; calculating a set of gradients based on the average loss value and the plurality of weights in the neural network; and adjusting the plurality of weights in the neural network based on the set of gradients.

In one embodiment, determining the subset of the plurality of loss values comprises determining a defined proportion of the plurality of loss values having the highest values and including the defined proportion of the plurality of loss values in the subset of the plurality of loss values.

In one embodiment, the present disclosure further comprises using multiple pluralities of training data selected from the training data set as multiple pluralities of inputs for training the neural network, wherein the neural network is further configured to iteratively process, for each plurality of inputs in the multiple pluralities of inputs, each input in the plurality of inputs based on the plurality of weights to generate multiple pluralities of outputs; for each plurality of outputs in the multiple pluralities of outputs, determining a plurality of loss values based on the plurality of outputs and the sets of expected output data of the corresponding plurality of training data in the multiple pluralities of training data; for each plurality of outputs in the multiple pluralities of outputs, determining a spread of the plurality of loss values; determining an average of the spreads; and determining a spread in the spreads having a highest value.

In one embodiment, determining the subset of the plurality of loss values comprises determining a particular spread of the plurality of loss values; upon determining that the particular spread of the plurality of loss values is less than or equal to the average of the spreads, including a first defined proportion of the plurality of loss values in the subset of the plurality of loss values having the highest values; upon determining that the particular spread of the plurality of loss values is greater than or equal to the spread in the spreads having the highest value, including a second defined proportion of the plurality of loss values in the subset of the plurality of loss values having the highest values; and, upon determining that the particular spread of the plurality of loss values is greater than the average of the spreads and less than the spread in the spreads having the highest value, including a third defined proportion of the plurality of loss values in the subset of the plurality of loss values having the highest values.

In one embodiment, the first defined proportion is greater than the second and third proportions and wherein the third proportion is greater than the second proportion.

In one embodiment, the accumulator is a first accumulator, the value is a first value, and the sum is a first sum. A second accumulator in the plurality of accumulators that receives the second product of the second pair of non-zero values performs the addition of the second product of the second pair of non-zero values to a second value to produce a second sum and the update of the second value with the second sum during a third execution cycle.

In one embodiment, the plurality of training data is a first plurality of training data is a first plurality of inputs for training the neural network, the plurality of outputs is a first plurality of outputs, the plurality of loss values is a first plurality of loss values, the average loss value is a first loss value, and the set of gradients is a first set of gradients. The program further comprises sets of instructions for using a second plurality of training data selected from the training data set as a second plurality of inputs for training the neural network, wherein the neural network is further configured to iteratively process each input in the second plurality of inputs based on the plurality of weights to generate a second plurality of outputs; determining a second plurality of loss values based on the second plurality of outputs and the sets of expected output data of the second plurality of training data; determining a subset of the second plurality of loss values, wherein a first proportion between a number of loss values in the subset of the first plurality of loss values and a number of loss values in the first plurality of loss values is less than a second proportion between a number of loss values in the subset of the second plurality of loss values and a number of loss values in the second plurality of loss values; determining a second average loss value based on the subset of the second plurality of loss values; calculating a second set of gradients based the second average loss value and the plurality of weights in the neural network; and adjusting the plurality of weights in the neural network based on the second set of gradients.

In one embodiment, a number of training data in the second plurality of training data is greater than a number of training data in the first plurality of training data.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A non-transitory machine-readable medium storing a program executable by at least one processing unit of a device, the program comprising sets of instructions for:
performing first training operations that decrease time to convergence of a plurality of weights as compared to conventional training operations, the first training operations including:
using a plurality of training data selected from a training data set as a plurality of inputs for training a neural network, wherein the neural network comprises the plurality of weights, wherein the neural network is configured to iteratively process each input in the plurality of inputs based on the plurality of weights to generate a plurality of outputs, wherein each training data in the training data set comprises a set of input data and a set of expected output data;
determining a plurality of loss values based on the plurality of outputs and the sets of expected output data of the plurality of training data;
selecting a subset of the plurality of loss values, the subset representing a fixed percentage of the loss values that are highest in value and comprising fewer than all of the plurality of loss values;
determining an average loss value based on the subset of the plurality of loss values;
calculating a set of gradients based on the average loss value and the plurality of weights in the neural network; and
adjusting the plurality of weights in the neural network based on the set of gradients; and
repeating the first training operations multiple times until the plurality of weights converge, wherein the fixed percentage of the loss values included in the subset of the plurality of loss values increases during later iterations of the first training operations as compared to earlier iterations of the first training operations.

2. The non-transitory machine-readable medium of claim 1, wherein determining the subset of the plurality of loss values comprises:
determining a defined proportion of the plurality of loss values having the highest values; and
including the defined proportion of the plurality of loss values in the subset of the plurality of loss values.

3. The non-transitory machine-readable medium of claim 1, wherein the program further comprises set of instructions for:
  using multiple pluralities of training data selected from the training data set as multiple pluralities of inputs for training the neural network, wherein the neural network is further configured to iteratively process, for each plurality of inputs in the multiple pluralities of inputs, each input in the plurality of inputs based on the plurality of weights to generate multiple pluralities of outputs;
  for each plurality of outputs in the multiple pluralities of outputs, determining a plurality of loss values based on the plurality of outputs and the sets of expected output data of the corresponding plurality of training data in the multiple pluralities of training data;
  for each plurality of outputs in the multiple pluralities of outputs, determining a spread of the plurality of loss values;
  determining an average of the spreads; and
  determining a spread in the spreads having a highest value.

4. The non-transitory machine-readable medium of claim 3, wherein determining the subset of the plurality of loss values comprises:
  determining a particular spread of the plurality of loss values;
  upon determining that the particular spread of the plurality of loss values is less than or equal to the average of the spreads, including a first defined proportion of the plurality of loss values in the subset of the plurality of loss values having the highest values;
  upon determining that the particular spread of the plurality of loss values is greater than or equal to the spread in the spreads having the highest value, including a second defined proportion of the plurality of loss values in the subset of the plurality of loss values having the highest values; and
  upon determining that the particular spread of the plurality of loss values is greater than the average of the spreads and less than the spread in the spreads having the highest value, including a third defined proportion of the plurality of loss values in the subset of the plurality of loss values having the highest values.

5. The non-transitory machine-readable medium of claim 4, wherein the first defined proportion is greater than the second and third proportions and wherein the third proportion is greater than the second proportion.

6. The non-transitory machine-readable medium of claim 1, wherein the plurality of training data is a first plurality of training data is a first plurality of inputs for training the neural network, wherein the plurality of outputs is a first plurality of outputs, wherein the plurality of loss values is a first plurality of loss values, wherein the average loss value is a first loss value, wherein the set of gradients is a first set of gradients, wherein the program further comprises sets of instructions for:
  using a second plurality of training data selected from the training data set as a second plurality of inputs for training the neural network, wherein the neural network is further configured to iteratively process each input in the second plurality of inputs based on the plurality of weights to generate a second plurality of outputs;
  determining a second plurality of loss values based on the second plurality of outputs and the sets of expected output data of the second plurality of training data;
  determining a subset of the second plurality of loss values, wherein a first proportion between a number of loss values in the subset of the first plurality of loss values and a number of loss values in the first plurality of loss values is less than a second proportion between a number of loss values in the subset of the second plurality of loss values and a number of loss values in the second plurality of loss values;
  determining a second average loss value based on the subset of the second plurality of loss values;
  calculating a second set of gradients based the second average loss value and the plurality of weights in the neural network; and
  adjusting the plurality of weights in the neural network based on the second set of gradients.

7. The non-transitory machine-readable medium of claim 6, wherein a number of training data in the second plurality of training data is greater than a number of training data in the first plurality of training data.

8. A method comprising:
  performing first training operations that decrease time to convergence of a plurality of weights as compared to conventional training operations, the first training operations including:
  using a plurality of training data selected from a training data set as a plurality of inputs for training a neural network, wherein the neural network comprises the plurality of weights, wherein the neural network is configured to iteratively process each input in the plurality of inputs based on the plurality of weights to generate a plurality of outputs, wherein each training data in the training data set comprises a set of input data and a set of expected output data;
  determining a plurality of loss values based on the plurality of outputs and the sets of expected output data of the plurality of training data;
  selecting a subset of the plurality of loss values, the subset representing a fixed percentage of the loss values that are highest in value and comprising fewer than all of the plurality of loss values;
  determining an average loss value based on the subset of the plurality of loss values;
  calculating a set of gradients based on the average loss value and the plurality of weights in the neural network; and
  adjusting the plurality of weights in the neural network based on the set of gradients; and
  repeating the first training operations multiple times until the plurality of weights converge, wherein the fixed percentage of the loss values included in the subset of the plurality of loss values increases during later iterations of the first training operations as compared to earlier iterations of the first training operations.

9. The method of claim 8, wherein determining the subset of the plurality of loss values comprises:
  determining a defined proportion of the plurality of loss values having the highest values; and
  including the defined proportion of the plurality of loss values in the subset of the plurality of loss values.

10. The method of claim 8 further comprising:
  using multiple pluralities of training data selected from the training data set as multiple pluralities of inputs for training the neural network, wherein the neural network is further configured to iteratively process, for each plurality of inputs in the multiple pluralities of inputs, each input in the plurality of inputs based on the plurality of weights to generate multiple pluralities of outputs;

for each plurality of outputs in the multiple pluralities of outputs, determining a plurality of loss values based on the plurality of outputs and the sets of expected output data of the corresponding plurality of training data in the multiple pluralities of training data;

for each plurality of outputs in the multiple pluralities of outputs, determining a spread of the plurality of loss values;

determining an average of the spreads; and determining a spread in the spreads having a highest value.

11. The method of claim 10, wherein determining the subset of the plurality of loss values comprises:

determining a particular spread of the plurality of loss values;

upon determining that the particular spread of the plurality of loss values is less than the average of the spreads, including a first defined proportion of the plurality of loss values in the subset of the plurality of loss values having the highest values;

upon determining that the particular spread of the plurality of loss values is greater than the spread in the spreads having the highest value, including a second defined proportion of the plurality of loss values in the subset of the plurality of loss values having the highest values; and upon determining that the particular spread of the plurality of loss values is greater than or equal to the average of the spreads and less than or equal to the spread in the spreads having the highest value, including a third defined proportion of the plurality of loss values in the subset of the plurality of loss values having the highest values.

12. The method of claim 11, wherein the first defined proportion is greater than the second and third proportions and wherein the third proportion is greater than the second proportion.

13. The method of claim 8, wherein the plurality of training data is a first plurality of training data is a first plurality of inputs for training the neural network, wherein the plurality of outputs is a first plurality of outputs, wherein the plurality of loss values is a first plurality of loss values, wherein the average loss value is a first loss value, wherein the set of gradients is a first set of gradients, the method further comprising:

using a second plurality of training data selected from the training data set as a second plurality of inputs for training the neural network, wherein the neural network is further configured to iteratively process each input in the second plurality of inputs based on the plurality of weights to generate a second plurality of outputs;

determining a second plurality of loss values based on the second plurality of outputs and the sets of expected output data of the second plurality of training data;

determining a subset of the second plurality of loss values, wherein a first proportion between a number of loss values in the subset of the first plurality of loss values and a number of loss values in the first plurality of loss values is less than a second proportion between a number of loss values in the subset of the second plurality of loss values and a number of loss values in the second plurality of loss values;

determining a second average loss value based on the subset of the second plurality of loss values;

calculating a second set of gradients based the second average loss value and the plurality of weights in the neural network; and adjusting the plurality of weights in the neural network based on the second set of gradients.

14. The method of claim 13, wherein a number of training data in the second plurality of training data is greater than a number of training data in the first plurality of training data.

15. A system comprising:

a set of processing units; and a non-transitory machine-readable medium storing instructions that when executed by at least one processing unit in the set of processing units cause the at least one processing unit to:

perform first training operations that decrease a quantity of time for achieving convergence of a plurality of weights as compared to conventional training operations, the first training operations including:

using a plurality of training data selected from a training data set as a plurality of inputs for training a neural network, wherein the neural network comprises the plurality of weights, wherein the neural network is configured to iteratively process each input in the plurality of inputs based on the plurality of weights to generate a plurality of outputs, wherein each training data in the training data set comprises a set of input data and a set of expected output data;

determining a plurality of loss values based on the plurality of outputs and the sets of expected output data of the plurality of training data;

selecting a subset of the plurality of loss values, the subset representing a fixed percentage of the loss values that are highest in value and comprising fewer than all of the plurality of loss values;

determining an average loss value based on the subset of the plurality of loss values;

calculating a set of gradients based on the average loss value and the plurality of weights in the neural network;

adjusting the plurality of weights in the neural network based on the set of gradients; and repeating the first training operations multiple times until the plurality of weights converge, wherein the fixed percentage of the loss values included in the subset of the plurality of loss values increases during later iterations of the first training operations as compared to earlier iterations of the first training operations.

16. The system of claim 15, wherein determining the subset of the plurality of loss values comprises:

determining a defined proportion of the plurality of loss values having the highest values; and including the defined proportion of the plurality of loss values in the subset of the plurality of loss values.

17. The system of claim 15, wherein the instructions further cause the at least one processing unit to:

use multiple pluralities of training data selected from the training data set as multiple pluralities of inputs for training the neural network, wherein the neural network is further configured to iteratively process, for each plurality of inputs in the multiple pluralities of inputs, each input in the plurality of inputs based on the plurality of weights to generate multiple pluralities of outputs;

for each plurality of outputs in the multiple pluralities of outputs, determine a plurality of loss values based on the plurality of outputs and the sets of expected output data of the corresponding plurality of training data in the multiple pluralities of training data;
for each plurality of outputs in the multiple pluralities of outputs, determine a spread of the plurality of loss values;
determine an average of the spreads; and
determine a spread in the spreads having a highest value.

18. The system of claim 17, wherein determining the subset of the plurality of loss values comprises:
determining a particular spread of the plurality of loss values;
upon determining that the particular spread of the plurality of loss values is less than the average of the spreads, including a first defined proportion of the plurality of loss values in the subset of the plurality of loss values having the highest values;
upon determining that the particular spread of the plurality of loss values is greater than the spread in the spreads having the highest value, including a second defined proportion of the plurality of loss values in the subset of the plurality of loss values having the highest values; and
upon determining that the particular spread of the plurality of loss values is greater than or equal to the average of the spreads and less than or equal to the spread in the spreads having the highest value, including a third defined proportion of the plurality of loss values in the subset of the plurality of loss values having the highest values.

19. The system of claim 18, wherein the first defined proportion is greater than the second and third proportions and wherein the third proportion is greater than the second proportion.

20. The system of claim 15, wherein the plurality of training data is a first plurality of training data is a first plurality of inputs for training the neural network, wherein the plurality of outputs is a first plurality of outputs, wherein the plurality of loss values is a first plurality of loss values, wherein the average loss value is a first loss value, wherein the set of gradients is a first set of gradients, wherein the instructions further cause the at least one processing unit to:
use a second plurality of training data selected from the training data set as a second plurality of inputs for training the neural network, wherein the neural network is further configured to iteratively process each input in the second plurality of inputs based on the plurality of weights to generate a second plurality of outputs;
determine a second plurality of loss values based on the second plurality of outputs and the sets of expected output data of the second plurality of training data;
determine a subset of the second plurality of loss values, wherein a first proportion between a number of loss values in the subset of the first plurality of loss values and a number of loss values in the first plurality of loss values is less than a second proportion between a number of loss values in the subset of the second plurality of loss values and a number of loss values in the second plurality of loss values;
determine a second average loss value based on the subset of the second plurality of loss values;
calculate a second set of gradients based the second average loss value and the plurality of weights in the neural network; and
adjust the plurality of weights in the neural network based on the second set of gradients.

* * * * *